Jan. 19, 1960  M. MILLER  2,922,054
MOTOR WIRING CONNECTOR
Filed June 6, 1957  2 Sheets-Sheet 1

INVENTOR.
MAURICE MILLER
BY
ATTORNEY.

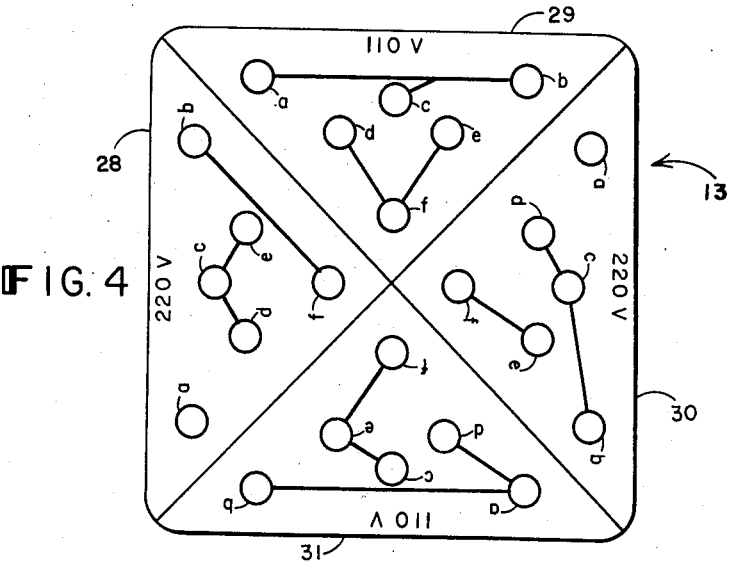
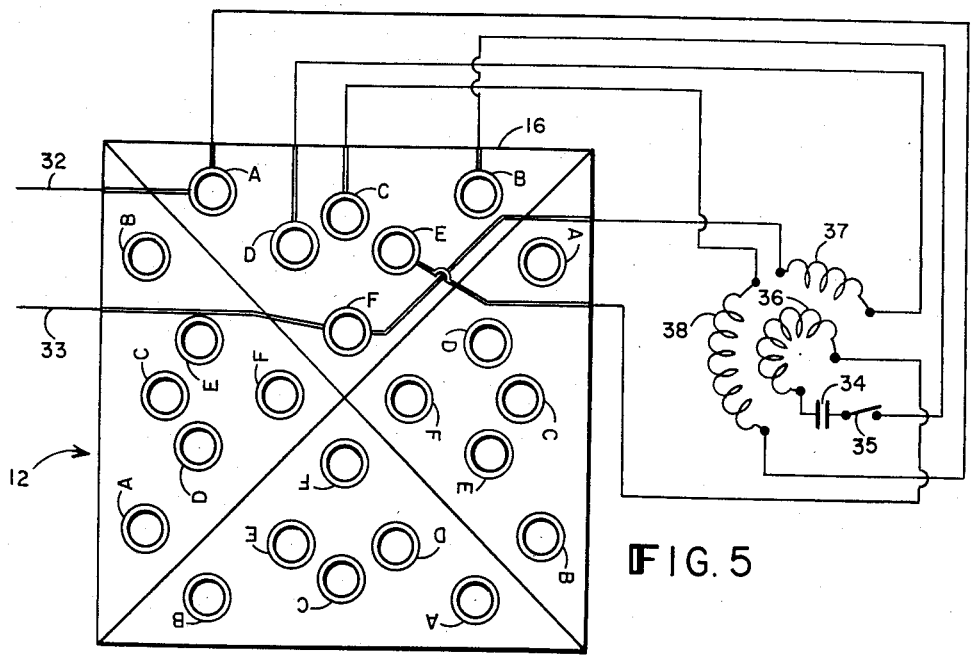

United States Patent Office 2,922,054
Patented Jan. 19, 1960

2,922,054

MOTOR WIRING CONNECTOR

Maurice Miller, Newton, Mass.

Application June 6, 1957, Serial No. 664,100

3 Claims. (Cl. 310—71)

This invention relates to electric machines and more particularly to a wiring connector to adapt wiring to a variety of operating conditions.

Heretofore, terminal structures for connecting up an electric machine such as a motor for operating under specified wiring conditions, such as speed, voltage, and direction of rotation have been of various constructions. Interior connections in the terminal boxes of these structures were usually by means of wire, connector plates, straps and the like, held in place by washers, nuts, and bolts. To change from one operating condition to another required the services of an experienced electrician to make a thorough inspection of the present wiring and to determine accurately the required internal wiring to satisfy the new operating condition. Even in the more simple rearrangements, the washers, nuts, bolts, straps, and wires were often difficult or even impossible to remove. The insulation on the permanent wiring in the terminal box was often blackened, frayed, and brittle and unsatisfactory to handle. To even slightly disturb this wiring, often required a complete new installation of the permanent wiring at the terminal structure resulting in significanct trouble and expense as after continued operation the wires lose their color identification and are often difficult to remove from the terminals. Wiring diagrams are sometimes obliterated or lost.

It is therefore an object of my invention to produce a terminal structure of the plug and jack type, adaptable to any type of electric motor and providing means for the instantaneous changing of the basic motor wiring for required changes in speed, voltage, direction of rotation, phase or any combination of these conditions.

My invention renders this operation fool-proof and one which can be made in seconds by any inexperienced person. Preferably it involves removing an insulated plug from a terminal jack and reinserting it, with a change in orientation, into the same jack insuring positive connections. Less preferably, a number of separate, different insulated plugs can be interchanged with the same jack. There are no terminal boxes to be opened and no wiring elements to be handled. There are no component parts to be lost or misplaced. As a result, costs of changes, maintenance, and repair are eliminated.

Further objects and a fuller understanding of the invention will hereinafter appear from the following description of a preferred embodiment illustrative of the invention and shown in the accompanying drawings in which Fig. 1 is a side view of a motor showing a jack arrangement with an associated plug in perspective.

Fig. 4 is a diagrammatic view of a typical plug unit showing the strapping arrangement of four plug groups for four combinations of motor voltage and rotation.

Fig. 5 is a front view showing the permanent wiring in an active jack group to be associated with the plug shown in Fig. 4 in selected *a*—A, *b*—B etc. arrangement with diagrammatic connecitons to a single phase 110–220 dual voltage capacitor motor, the remaining three groups being unwired.

Figure 1:
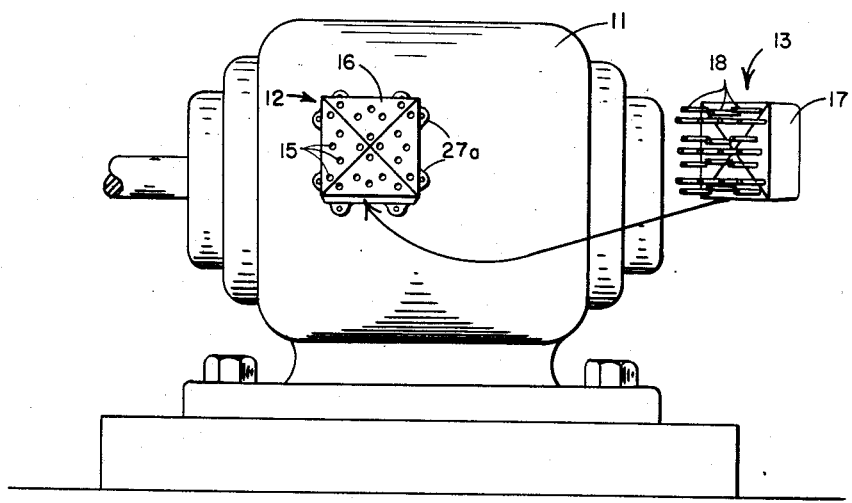
Figures 2, 3:
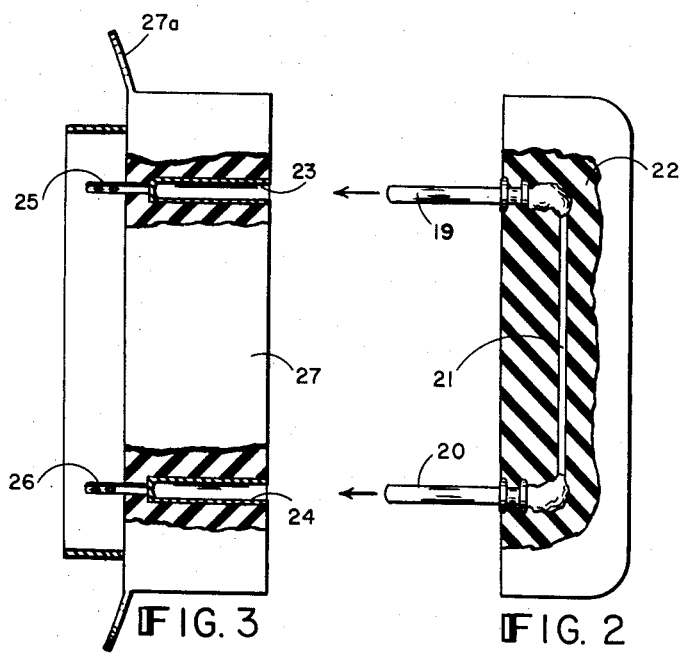
Fig. 2 is a side view partly broken away showing a typical strapping arrangement between the plug elements embedded in insulating material.
Fig. 3 is a side view partly broken away showing two typical jack elements embedded in insulation and associated wiring terminals.

The device essentially consists of two-part multi-contact wiring adapter comprising a jack, preferably a multi-unit jack, and a cooperating plug, preferably a multi-unit plug, the number of terminals provided being determined by the type of motor, single or multi-phase and the supply feed, two or three wire, low or high voltage. Each of the plug units is interiorly wired and completely self-contained in insulating material. The plug unit preferably comprises the plug elements and wiring embedded in an insulating plastic so that the only protrusions are the portions of the plug elements which cooperate with the jack. Preferred plastics include casting compounds of thermosetting resins such as epoxy or phenolic but are not limited thereto. Thermoplastic compounds may also be used such as those comprising polystyrene and analogs thereof. Only one of the jack units is permanently wired to the end terminals of the component windings of the motor to which it is attached, the remaining jack units in the multi-unit jack being unwired.

Where the location of a motor or a group of motors is not readily accessible, the end terminals of the component windings of the motors may be cabled to my jack plates located at a remote or centralized panel, easy to be equipped with cooperating plugs as described.

Referring to the drawings the device therein shown as illustrative of one embodiment of my invention comprises a multi-unit plug 13 having a cap 17 and individual plugs as shown at 18, 19, and 20 which are strapped together by straps such as 21, said plugs and straps being permanently embedded in insulating material 22, and a multi-unit jack 16 with individual jacks such as 15, 23, and 24. The jacks such as 23 and 24 imbedded in a plastic insulating base 27, have integral wiring terminals 25 and 26 to which are connected the permanent wiring to the terminal ends of the motor capacitor, capacitor switch, starter coils, field coils, and motor components, such as 34, 35, 36, 37, and 38. The cap 17 is divided into four groups of plug connectors 28, 29, 30, and 31, the relative positions of each plug of each group being identical such as *a*, *b*, *c*, *d*, *e*, and *f*. The jacks A, B, C, D, E, and F are positioned so as to register with any group of plugs *a*, *b*, *c*, *d*, *e*, and *f*. The power leads 32 and 33 are permanently terminated in the jack 16.

In operation, the complete plug 13 is inserted into the complete jack 16. The upper quadrant group (Fig. 5) is wired permanently to the motor and the power supply, the other three quadrant groups are unwired. If plug group 29, as shown in Fig. 4 is plugged into the top quadrant of the plug, standard motor circuit wiring for 110 volt operation with rotation in a given direction will result. Likewise, removal and rotation of plug 13 and insertion of plug group 31 into the same top quadrant will result in the completion of standard motor wiring connections for 110 volt operation in the opposite direction of rotation. Similarly plugging in of group 28 will result in the completion of standard motor wiring connections for 220 volt operation in a given direction and insertion of plug group 30 results in connections for 220 volt operation in the opposite direction of rotation.

While one embodiment of my invention has been shown and described in detail, it will be understood that I do not wish to be limited to the particular construction set forth, since various changes in the form, material, proportions, and arrangement of parts, and in the details of construction may be resorted to without departing from the spirit and scope of the invention, or destroying any of the advantages contained in the same, heretofore described and defined in the following claims.

I claim:

1. A two-piece motor wiring connector comprising a fixed multi-jack terminal plate permanently attached to an electric motor and a detachable multi-plug switch plate, said terminal plate having a plurality of symmetrically disposed groups of jacks, each of said groups of jacks having a plurality of similarly arranged jacks, said switch plate having a plurality of similarly disposed groups of plugs, each of said groups of plugs having a plurality of similarly arranged plugs, any one group of plugs on said switch plate being registrable with any one group of jacks, in said terminal plate, the plugs of the complete switch plate being registrable with the jacks of the complete terminal plate and adapted to be inserted therein, one of said groups of jacks being permanently wired to the end terminals of the component windings of said motor, the remaining groups of jacks being unwired, various selected terminals of each group of plugs being permanently strapped together within said group, each of said groups of strapped plugs when inserted into the said wired group of jacks completing the standard circuit for a motor of specified winding, speed, voltage, and direction of rotation, said strapping being interiorly positioned and self contained in insulating material.

2. A two part multi-contact connector for an electric motor, comprising a fixed terminal plate permanently mounted on the frame of said motor and a cooperating, detachable, interiorly wired, self contained motor wiring adapter, said plate having a predetermined number of groups of jack terminations, each of said groups being arranged in the same predetermined relative position, the jacks of each group being disposed in a similar relative predetermined position, the terminations of one group of jacks being permanently wired to the end terminals of various starter, field and auxiliary coils, the remaining groups of jacks being unwired, said adapter having a similar number of groups of plug connectors, the relative position of each plug in each group being identical, each group of plugs being registrable for insertion with corresponding cooperating jacks of each of the group of jacks in said plate, selected plugs in each group being strapped together within said group, said intragroup strapping of each group being interiorly positioned and self contained in insulating material and providing standard motor connections for various combinations of speed, voltage, and rotation, upon insertion of each respective plug group into said wired jack group.

3. A two part multi-contact connector for a single phase, dual voltage, capacitor motor comprising a fixed terminal plate permanently mounted on the frame of said motor, and a cooperating detachable, interiorly wired, self contained motor wiring adapter, said plate having four groups of similarly disposed jack terminations, the terminations of one group being permanently wired to the end terminals of the capacitor, starting coil and field coils of said motor and to which the power service wires are also attached, the remaining three groups of jacks being unwired; said adapter having four similar groups of plug connectors, the relative position of each plug of each group being identical, each group of plugs being registrable with corresponding cooperating jacks of each of the four groups of jacks in said plate; one group of plugs on said adapter being permanently and interiorly strapped to complete the standard wiring for 110 volt operation with clockwise rotation of said motor when said group of plugs of said adapter is inserted in said wired group of jacks in said terminal plate, another group of plugs adapted for similar insertion being permanently and interiorly strapped for 110 volt operation with counter clockwise rotation, another group of plugs being permanently and interiorly strapped for 220 volt operation with clockwise rotation and another group of plugs being permanently and interiorly strapped for 220 volt operation with counter clockwise rotation.

References Cited in the file of this patent

UNITED STATES PATENTS

| 2,619,621 | Brown | Nov. 25, 1952 |
| 2,663,000 | Keith | Dec. 15, 1953 |
| 2,874,317 | Couse | Feb. 17, 1959 |

FOREIGN PATENTS

| 638,265 | France | Feb. 20, 1928 |